(12) United States Patent
Campbell et al.

(10) Patent No.: US 6,725,808 B2
(45) Date of Patent: Apr. 27, 2004

(54) PORTABLE CORRAL APPARATUS

(75) Inventors: Darrell D. Campbell, Buffalo Gap, SD (US); Dana Sander, Buffalo Gap, SD (US)

(73) Assignee: Prairie Ridge Partners, Buffalo Gap, SD (US)

( * ) Notice: Subject to any disclaimer, the term of this patent is extended or adjusted under 35 U.S.C. 154(b) by 0 days.

(21) Appl. No.: 10/351,656

(22) Filed: Jan. 24, 2003

(65) Prior Publication Data

US 2003/0209207 A1 Nov. 13, 2003

Related U.S. Application Data

(63) Continuation-in-part of application No. 10/141,227, filed on May 7, 2002.

(51) Int. Cl.[7] ................................................. A01K 3/00
(52) U.S. Cl. ........................ 119/513; 119/512; 119/519
(58) Field of Search ................................ 119/513, 512, 119/502, 504, 514, 519, 522, 840, 843

(56) References Cited

U.S. PATENT DOCUMENTS

| 2,678,629 A | 5/1954 | Meyer |
|---|---|---|
| 2,935,965 A | 5/1960 | Smith |
| 3,726,256 A | 4/1973 | Bernhardt et al. |
| 3,741,529 A | 6/1973 | Blagg |
| 3,767,167 A | 10/1973 | Rasmussen |
| 3,921,585 A | 11/1975 | Hall |
| 3,970,045 A | 7/1976 | Graham, Jr. |
| 4,048,959 A | 9/1977 | Steele |
| 4,090,472 A | 5/1978 | York |
| 4,250,836 A | 2/1981 | Smith |
| 4,366,775 A | 1/1983 | Tyquin |
| 4,537,151 A | 8/1985 | Bolton |
| 4,619,223 A | 10/1986 | Koehn |
| 4,630,570 A | 12/1986 | Wilson et al. |
| 4,821,679 A | 4/1989 | Hackert |
| RE33,959 E | 6/1992 | Mollhagen |
| 5,651,333 A | 7/1997 | Fisher |

*Primary Examiner*—Yvonne R. Abbott
(74) *Attorney, Agent, or Firm*—Gordon & Rees LLP

(57) ABSTRACT

A corral apparatus has mounting brackets for securing at spaced locations on a wall of a vehicle, livestock trailer, or building, a pair of side panels each having a first end pivotally connected to a respective bracket, and an end panel pivotally secured between the second ends of the side panels, whereby the apparatus can be pivoted between an operative condition in which each side panel extends transverse to the surface and the end panel extends between the ends of the side panels, and a storage position in which the panels are folded flat against one another and the surface. The side panels are adjustable in length to vary the size of the coral.

43 Claims, 9 Drawing Sheets

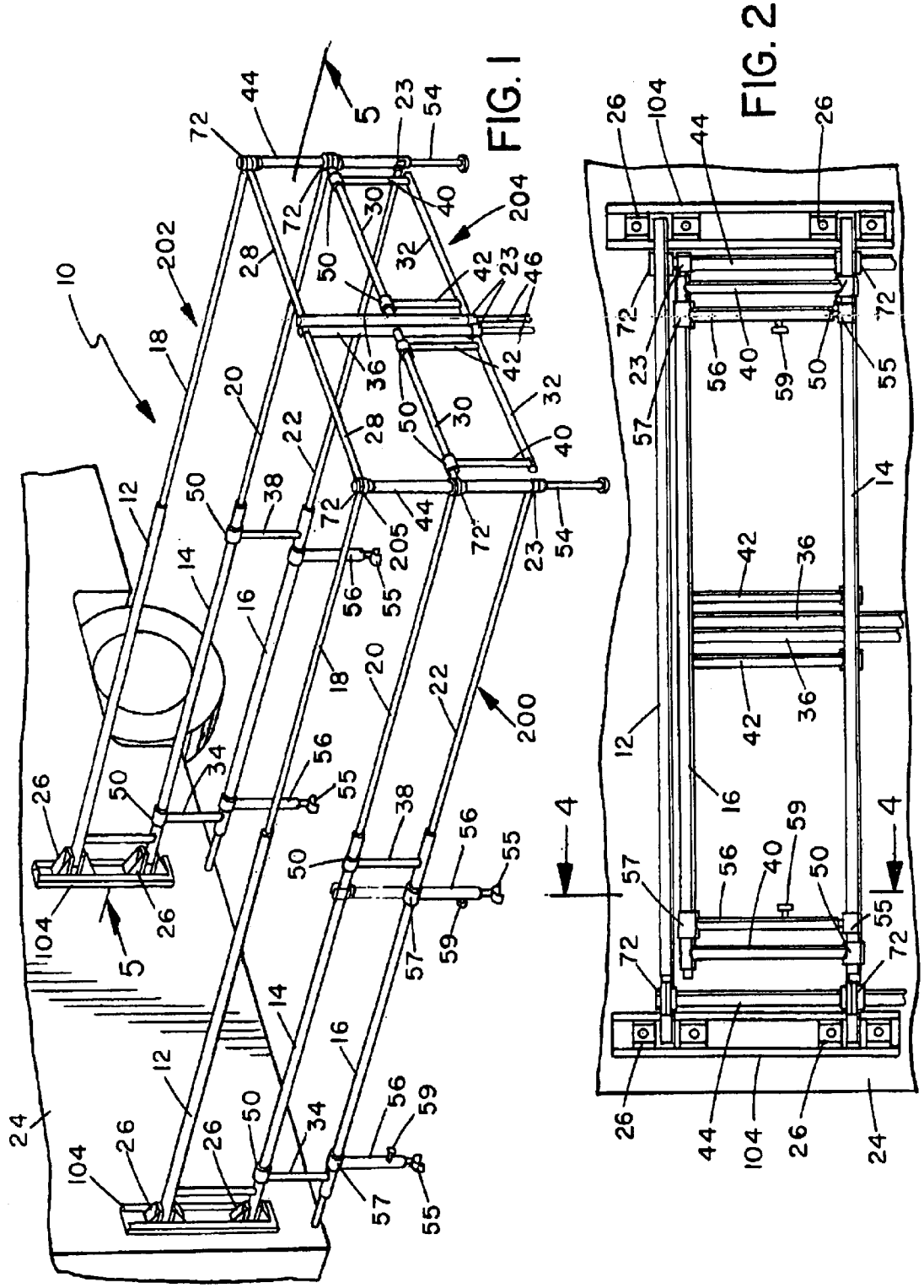

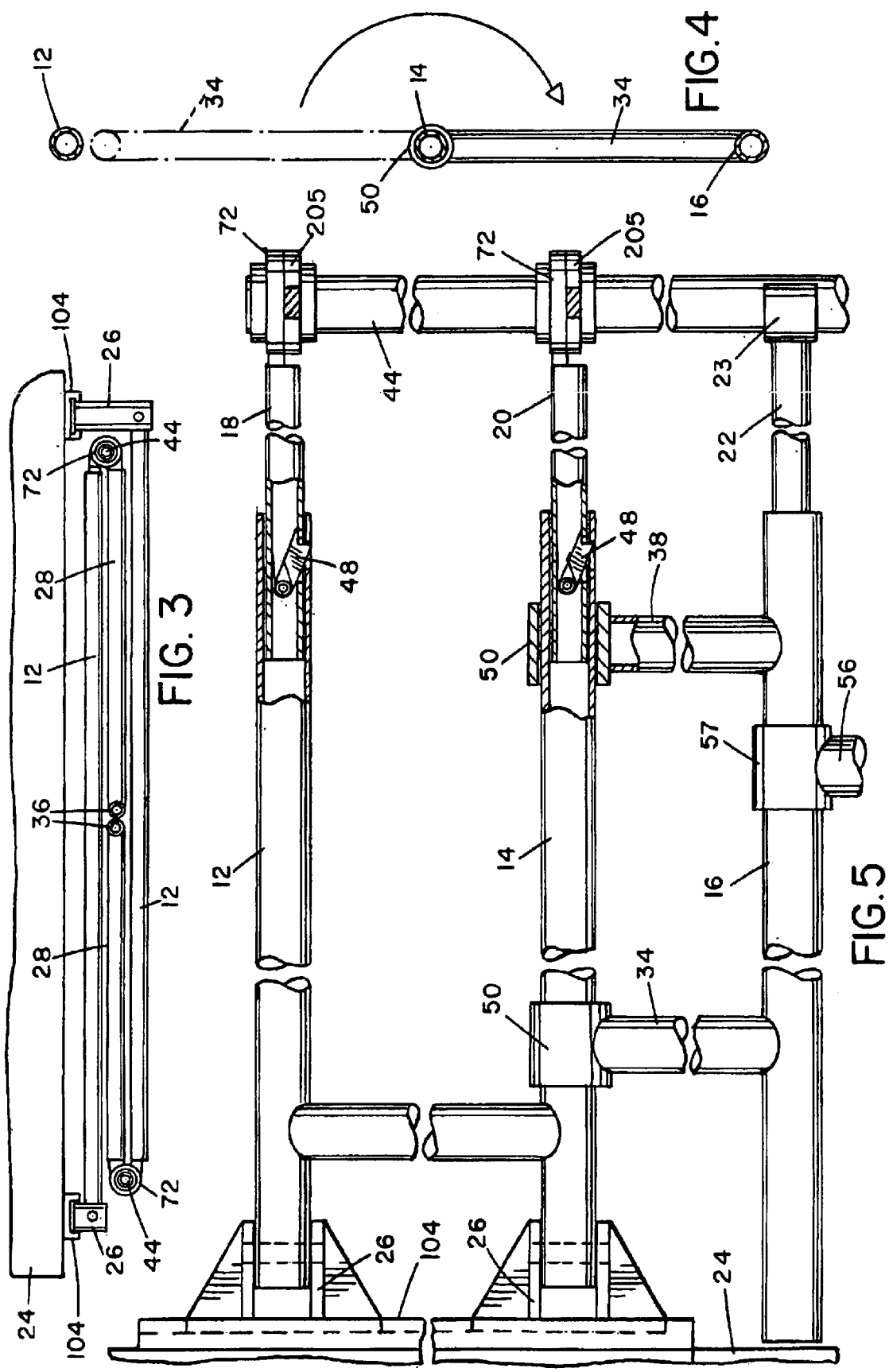

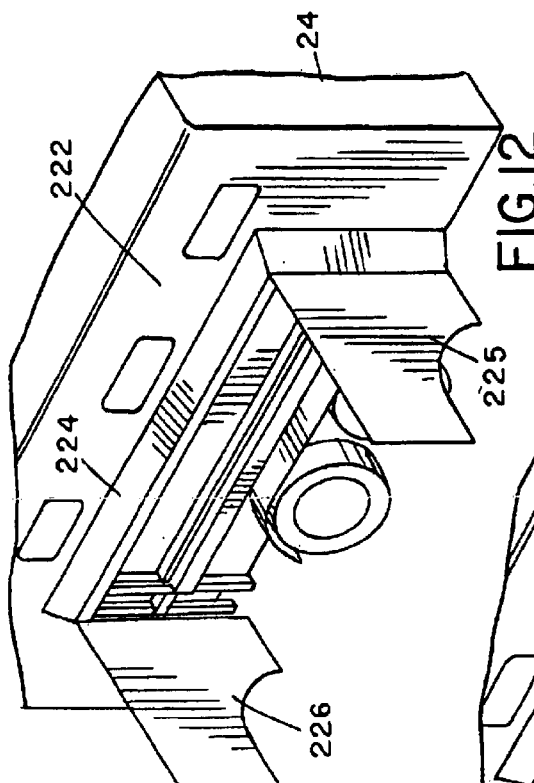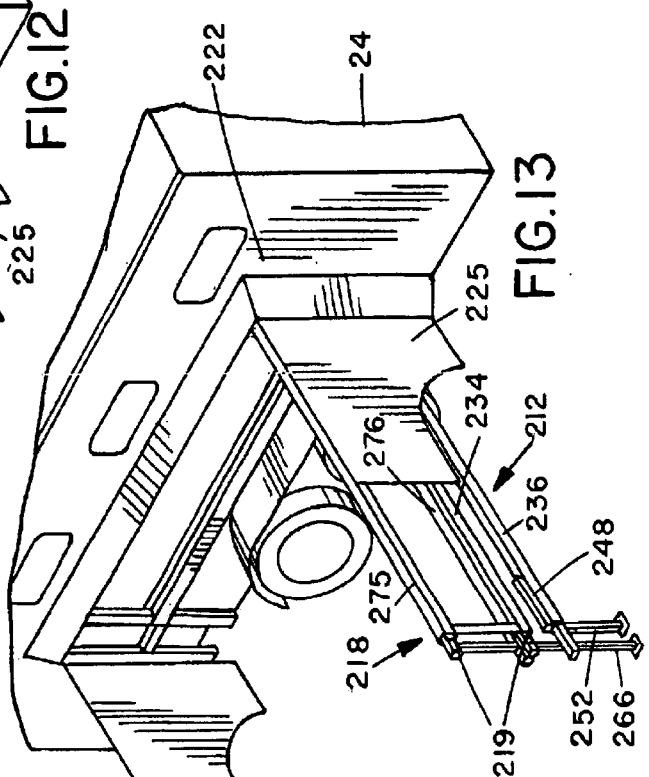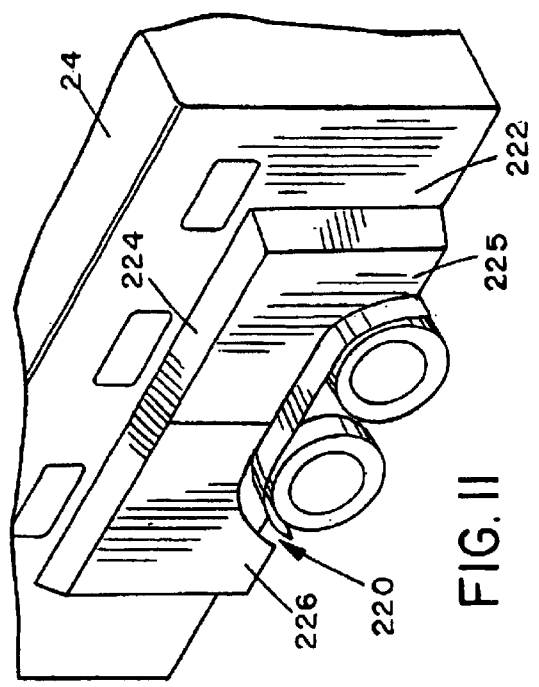

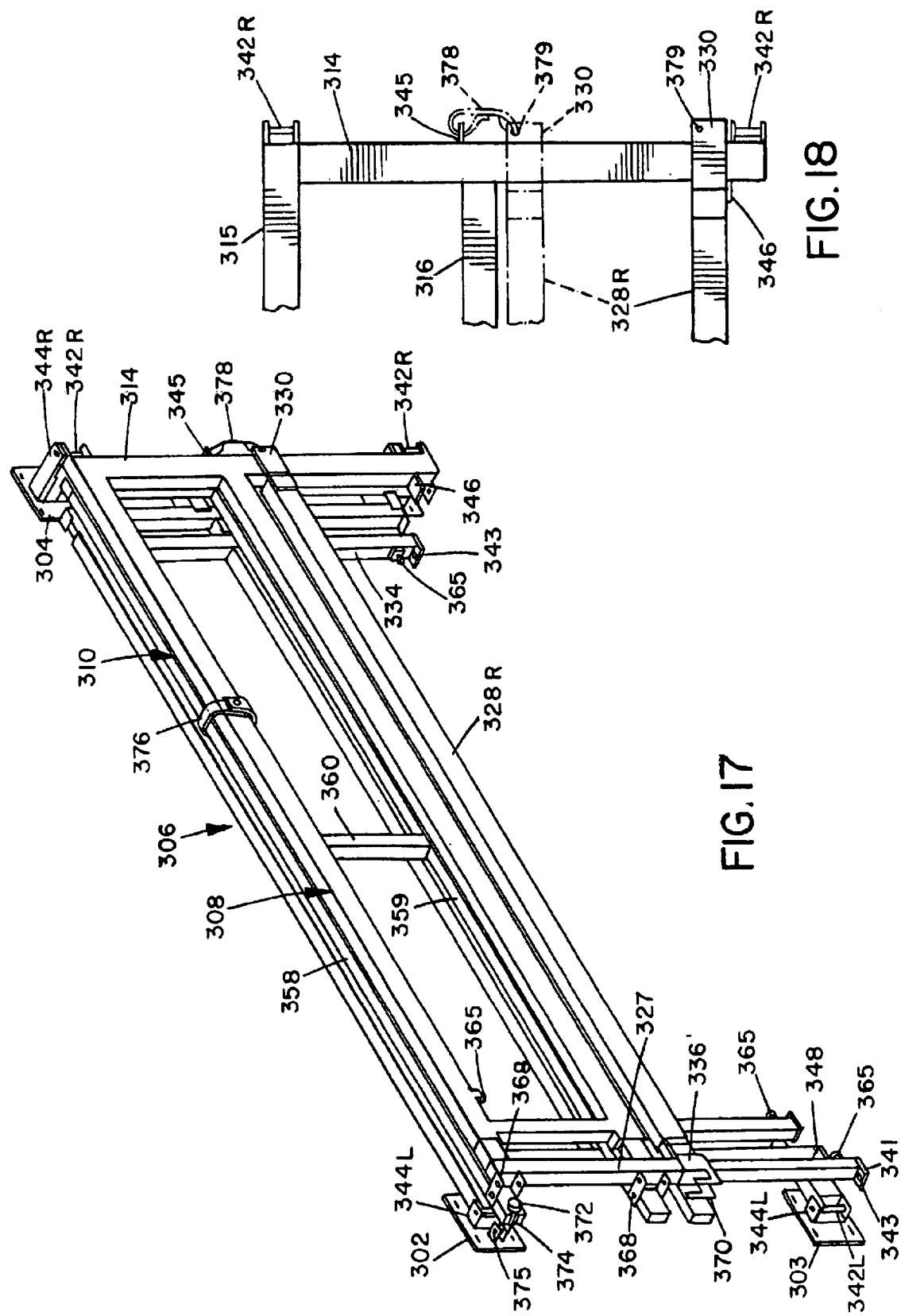

PORTABLE CORRAL APPARATUS

CROSS REFERENCE TO RELATED APPLICATIONS

This application is a Continuation-In-Part of pending application Ser. No. 10/141,227, filed May 7, 2002.

BACKGROUND OF THE INVENTION

The present invention relates generally to portable corrals for horses or other animals, and is particularly concerned with a corral for attachment to a horse trailer or other animal transportation vehicle, or to a wall of a building such as a barn.

Horses used for competition and recreation are frequently transported via horse trailer to a variety of locations for such activities. Unfortunately, many of these locations either do not have facilities for horses to be stalled, the facilities are full, or the facilities are unsafe. Those traveling with horses, therefore, often bring along corral equipment that can be set up at the location for confining the horse. This equipment is either removably attached to the horse trailer or carried in the tow vehicle.

Materials often used in making these portable corrals include metal piping formed into fence panels, rope or electric wire, or woven plastic or rope. These materials are often connected to portable stakes driven into the ground to form fence posts.

Portable metal corrals have been used by those handling livestock for many years because of metal's durability and high-visibility to the animal. Specifically, many forms of portable corrals have been invented. Many of these corrals, however, are cumbersome due to multiple parts that must be lifted and removed from the trailer and require time-consuming assembly. For example, U.S. Pat. No. 4,537,151 to Bolton discloses that the corral assembly be hoisted with a winch along a vertical support pipe up onto mounting brackets. The corral assembly by Blagg, U.S. Pat. No. 3,741,529 is so weighty and cumbersome that it requires two men to load and unload the assembly from the horse trailer. Bernhardt, U.S. Pat. No. 3,726,256, requires that part of the assembly be placed on the roof of the trailer and parts of it be lifted onto a holding means on the side of the trailer.

There are times when the horse person may wish to adjust the size of the corral due to parking constraints or terrain concerns. In this situation, none of the above corrals could be made smaller or of un-uniform size.

Safety is the key concern of a person traveling with a horse. Some portable corrals on the market are of such a height or material that they allow a horse to reach over the top rail or under the bottom rail with its head in an attempt to graze, leading to an unsafe situation if the horse were to become startled. Additionally, the corral assembly may become damaged.

Fences are also used on people's property to contain and protect pets and children. Such fences are usually permanently installed with posts driven into the ground. A permanent fence may not be ideal in terms of cost, aesthetic concerns or for people who are not permanent residents of the property. Non-permanent fences in the past have been unstable and cumbersome to assemble.

People traveling in motor homes or with travel trailers often travel with their pets and children. Having a "yard" for the pets or children to play safely in would be advantageous. As space in such motor homes or travel trailers is often limited, such yard fencing would best be stored on the exterior of the vehicle in a compacted form.

SUMMARY OF THE INVENTION

It is an object of the present invention to provide a new and improved corral for temporary stabling and handling of livestock which can be mounted in a folded position on a horse trailer and then unfolded and expanded with ease. A further object of the invention is to provide a new and improved enclosure for attachment to other vehicles, such as recreational vehicles and other trailers. Additionally, the claimed invention may be attached to a home to provide a non-permanent fence to enclose pets or to prevent children from entering a dangerous area such as a pool, or may be attached to a barn wall to provide a collapsible animal enclosure.

According to the present invention, a corral apparatus is provided, which comprises mounting brackets for securing at predetermined spaced locations on a surface of a vehicle, trailer, or building, a first side panel having a first end pivotally secured at least one of the mounting brackets and a second end, a second side panel having a first end pivotally secured to the other mounting bracket and a second end, each of the side panels being adjustable in length, and a third end panel extending between the second ends of the side panels, whereby an enclosure is formed by the surface, side panels, and end panel, the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface.

The end panel may be pivoted at one end to one of the side panels and releasably secured to the other side panel end. In an exemplary embodiment, the end panel is formed in one part, but may be formed in two parts, one part pivoted to one of the side panels and the other part pivoted to the other side panel, with the two parts releasably connected together to provide a gate for entry and exit from the enclosure, as well as to allow the end panel to be collapsed against the side panels for storage.

The two side panels may each be formed from two telescoping or relatively slidable parts to allow for adjustment of the size of the corral. For example, one part or panel portion may have upper and lower channels on its inner or outer face slidably engaged with upper and lower bars on the other part or panel portion, which is offset outwardly or inwardly from the other panel portion so as to slide over it into a retracted position to reduce the corral size. In an exemplary embodiment of the invention, each side panel is formed from at least two parallel rails extending between vertical end posts, and each rail is formed from two telescopically engaged members to allow the length of the panel to be adjusted.

When the apparatus of this invention is secured to a vehicle such as a livestock or horse trailer, it may be readily stored flat against a wall of the trailer during transportation. Upon arrival at a destination, it can be deployed quickly and easily by one person, simply by folding out the side and end walls and adjusting to the desired size. The side and end panels in an exemplary embodiment are all formed by vertical tubular posts and horizontal tubular rails extending between the posts, and are of relatively lightweight construction, so that they can be deployed and collapsed easily by one person.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a perspective view of the corral structure according to a first exemplary embodiment of the invention erected on the side of a horse trailer;

FIG. 2 is a side view of the corral structure folded and stored;

FIG. 3 is a top plan view of the folded structure of FIG. 2;

FIG. 4 is an enlarged sectional view taken on line 4—4 of FIG. 3;

FIG. 5 is a further enlarged sectional view taken on line 5—5 of FIG. 1, with portions cut away;

FIG. 11 is a perspective view showing an enclosing cover on the vehicle;

FIG. 12 is a view similar to FIG. 11, with the cover doors open;

FIG. 13 is a similar view with one side of the structure opened;

FIG. 17 is a perspective view of the apparatus of FIG. 16 in a collapsed, folded storage condition;

FIG. 18 is an enlarged view of the end of one side panel, illustrating the raised and lowered positions of the lower rail.

DETAILED DESCRIPTION OF THE DRAWINGS

Figure 6:
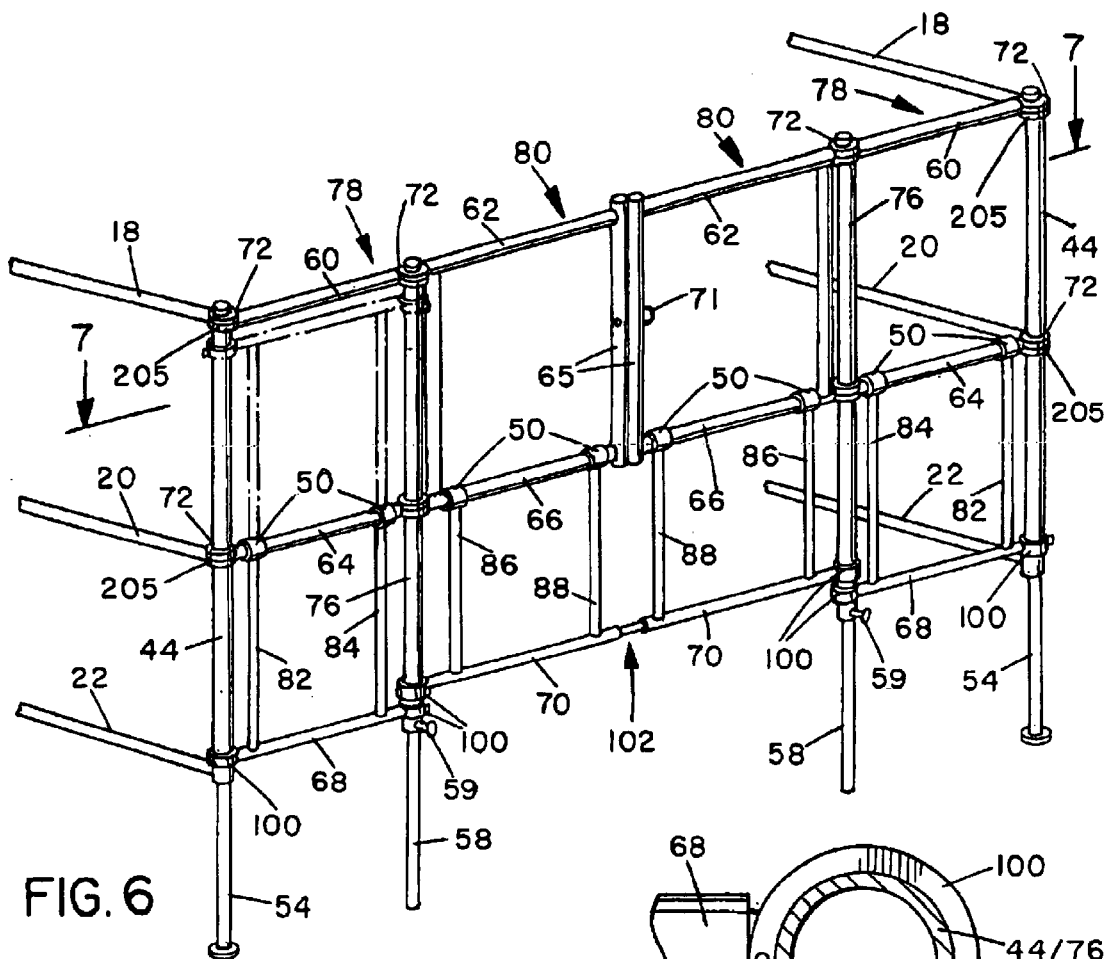
FIG. 6 is a perspective view of a portion of the erected structure, showing an alternative gate configuration.

FIGS. 1 to 5 illustrate a corral apparatus 10 according to a first embodiment of the invention mounted on a side wall or end wall of a livestock trailer 24, such as a horse trailer. Although the apparatus is illustrated mounted on a side wall of the trailer, it may alternatively be mounted on an end wall so that it extends from each side of an access door to the trailer. In this case, the trailer door may be left open to provide shelter for animals in the enclosure or to facilitate loading or unloading of animals. The corral apparatus may also be secured to a fixed building rather than a vehicle, to provide a temporary corral as needed, which can be stored flat when not in use.

The apparatus basically comprises a pair of mounting brackets 104 for mounting at spaced locations on the wall of a trailer 24 or a building, a pair of side panels 200, 202 each pivotally mounted at one end on one of the brackets 104 via hinges or pivot devices 26, as best illustrated in FIG. 5, and an end panel 204 extending between the opposite ends of side panels 200,202 to form an enclosure for animals when in the deployed position illustrated in FIG. 1. The panels are designed to be collapsed flat against the wall 24 for storage, as indicated in FIGS. 2 and 3, as will be explained in more detail below. The pivot devices 26 are slidably engaged in each mounting bracket 104 in the illustrated embodiment, to permit the corral apparatus to be removed completely from the trailer if desired. However, the devices may alternatively be permanently secured to the brackets 104 if removability of the corral apparatus is not necessary.

In the illustrated embodiment, each side panel comprises a set of spaced, parallel horizontal rails 12, 14 and 16 extending from the respective mounting bracket 104, and a vertical end post 44. The top and middle rails 12, 14 are each pivotally connected at their first ends to the respective mounting bracket 104 by the pivot devices 26. Each rail 12, 14, 16 has a telescoping end portion 18,20,22 of reduced dimensions projecting from the end remote from mounting bracket 104, and each end portion is secured to the end post 44 at its outer end. As best illustrated in FIG. 5, end portions 18 and 20 are permanently secured to post 44 via fasteners 72, while the lower rail end portion 22 is releasably connected to post 44 via a U-shaped releasable clamp fastener 23, for example. The telescoping end portions allow the length of the respective side panel to be adjusted, between the fully extended condition illustrated in FIG. 1, and the fully collapsed position illustrated in FIGS. 2 and 3, in which the end portions are telescoped inwardly as far as possible into the rails 12, 14 and 16.

Each vertical post 44 has a lower leg 54 which is telescopically engaged in the remainder of the post, so that it can be extended to touch the ground for stability when the corral is deployed, while being retracted upwardly into the remainder of the post for storage purposes when the corral is not in use. Any suitable hand-tightening mechanism may be used to secure the leg 54 in the extended and retracted positions, such as a snap pin at each end of leg 54 for snap engagement in a hole in the post 44 in each of the end positions. Similarly, each lower rail 16 has a pair of legs 56 rotatably coupled to the rail 16 via collars 57, each having a U-shaped or horseshoe shaped bracket or clamp 55 at its lower end. Each leg can be rotated between a raised position in which it extends upwardly from rail 16 with bracket 55 engaged over the middle rail 14, as indicated in dotted outline in FIG. 1, and a lowered position in which it extends downwardly from rail 16 with the bracket 55 engaging the ground for added stability of the corral, as indicated in solid lines in FIG. 1. When the legs 56 are rotated upwardly about the collar 57, the bracket 55 may be retracted inwardly into each leg 56 by releasing pop pin 59 or other hand-tightening mechanism, so that each bracket or clamp 55 can engage around the rail 14 as indicated. The U or horse-shoe shaped clamps 55 will dig into relatively soft ground, such as turf, or may be fitted into suitable flat pads of rubber, metal or the like for use on ground which is too hard for this purpose.

Each bottom rail 16 is also rotatably attached to the middle rail so that it can be rotated upwardly for storage purposes, via spaced arms 34,38 extending upwardly from rail 16 and rotatably attached to rail 14 via collars 50, as best illustrated in FIGS. 4 and 5. The clamps or U-brackets 55 will also rotate relative to rail 14 as the bottom rail is raised or lowered. FIG. 2 illustrates the bottom rail folded upwardly into the storage position located adjacent upper rail 12, as also illustrated in dotted outline in FIG. 4. Prior to folding, the bottom rail is first released from end post 44 by releasing fastener 23, retracting telescoping end portion 22 inwardly into rail 16. The legs 56 are then rotated upwardly and coupled with rail 14. Finally, bottom rail 16 is rotated upwardly into the dotted outline position of FIG. 4. At this point, end portion 22 may be extended slightly to reengage fastener 23 with post 44, holding the rail 16 in the upwardly folded position. It will be apparent that this rail can be readily folded back downwardly when the respective panel is extended, as indicated by the arrow in FIG. 4. Fastener 23 may be any suitable mechanical clamp, clip, fastener, tie, or magnet, for example, in place of the U-shaped clamp illustrated in the drawings.

FIG. 5 also illustrates the releasable latch 48 for holding each telescoping end portion 18,20,22 in the fully extended or retracted positions. Each of the rails 12, 14, 16 has an opening 49 adjacent its outer end, and the respective telescoping end portion 18,20,22 will have openings 51 which align with opening 49 in the fully extended and retracted positions. A latch 48 is pivotally mounted in each end portion adjacent the openings 49, and will drop into the latched position indicated in FIG. 5 in which it engages in openings 49 and 51 to secure the end portion in position. The latch may be released by pushing it inwardly from the position shown. In an alternative arrangement, a spring loaded pop pin may be mounted on the respective rail 12, 14, 16 for releasable engagement through holes 49 and 51 when aligned, and additional holes 51 may be provided in the telescoping end portions 18,20 and 22 if desired, for allowing the side panels to be adjusted between various possible different lengths. The respective side panel can readily be extended by releasing the latches and then pulling post 44 away from the trailer until the desired extension is reached.

The end panel 204 is of similar parallel rail construction to the side panels, but is not telescopically extendible, and is arranged to provide a gate for corral entry and exit purposes. In the embodiment illustrated in FIG. 1, the end panel 204 is formed in two halves, each half pivotally connected to a respective panel end post 44. Each half of the end panel comprises three spaced parallel rails 28,30 and 32. Each upper and middle rail is pivotally connected to the respective end post 44 at one end via a rotatable collar 205 or other hinge connection, as best seen in FIGS. 1 and 5, and secured to a vertical end post 36 at the opposite end. When the end panel is in the deployed condition of FIG. 1, each half panel extends perpendicular to the respective side panel and the end posts 36 are positioned side-by-side, and may be releasably secured together by a suitable latching mechanism (not illustrated). Like the side panel end posts 44, end posts 36 of the two half panels also have a lower telescoping leg 46 which may be extended to provide further support when the end panel is deployed, and which is retracted when the corral is to be collapsed for storage.

The lower rail 32 of each half panel is rotatable relative to the middle rail 30 via collars 50 rotatably mounted on the middle rail 30 and legs 40,42 which secure collars 50 to the respective lower rail. Extendible, releasable C-clamps 23 or the like may be provided at the end of each rail 32 for releasable connection to the end rail 36 in both the lowered and raised positions, as was the case with the lower rail 16 of the side panels. Clamps 23 may be provided at only one end of each rail 32, or at both ends if needed for added security.

FIG. 1 illustrates the corral apparatus in the fully extended and deployed condition. It will be understood that the overall size of the corral may be adjusted simply by sliding each of the side panel rail end portions 18,20,22 inwardly to provide the desired overall area of the corral. One or both end half panels can be opened outwardly by releasing the end posts 36, and swinging each half panel outwardly by pivoting collar 205 about post 44, allowing animals to enter or exit or an owner to enter the corral. When the animals are to be transported to another location, the corral can be readily collapsed for storage. The animals are first secured inside the trailer 24. The two halves of the end panel are then released from each other, the legs 46 are raised, and the lower rails 32 are rotated upwardly and re-secured to the end posts 36 in the storage position, in which each rail 32 is positioned adjacent the upper rail 28 (similar to the dotted line position of FIG. 4 for the side rails).

The end portions of each side panel are then retracted inwardly into the respective rail 12, 14 and 16, and the lower legs 54 of each end post 44 are pushed upwardly into the respective post. The lower rails 16 are raised into the upper position illustrated in dotted outline in FIG. 4. At this point, each half panel is rotated in order to lie flat against the respective side panel, with one half panel being rotated outwardly to lie against the outside face of one side panel, and the other half panel being rotated inwardly to lie against the inside face of the other side panel. The first side panel is then rotated inwardly about pivots 26 to lie against trailer wall 24, and the second side panel is rotated inwardly to lie against the first side panel, with the two half panels located between the side panels, as best illustrated in FIG. 3. Suitable securing devices (not illustrated) will be provided for releasably holding the corral apparatus in the collapsed position of FIGS. 2 and 3.

It will be understood that the foregoing operation can be readily reversed in order to deploy the corral apparatus, simply by folding each side panel outwardly, extending the end portions 18,20 and 22 as desired, rotating the half panels perpendicular to the side rails to form a gate, and lowering the lower rails of the side and end panels and the support legs 54,56 and 46. This can be done quickly and easily by one person, and does not require lifting of any heavy weights or handling of a large number of cumbersome fastener devices. Animals in the trailer can then be released into the corral for grazing or the like while the owner is otherwise occupied, or for preparation for a riding event or the like.

Although the end panel is formed from two half panels in the embodiment illustrated in FIGS. 1 to 5, each pivotally mounted on the respective side panel end post, and which can be swung outwardly to provide a gate, it may alternatively be made in one piece, which is pivotally secured at one end to one of the posts 44, and releasably secured to the other post 44. In order to collapse the corral in this case, the end panel is simply released from one of the side panels at one end and folded inwardly against the other side panel. The rails and end posts may all be of lightweight tubular metal of circular cross-section, although they may alternatively be bars of different cross-section such as square. Additionally, instead of forming each side and end panel of vertical posts and horizontal rails, as in the illustrated embodiment, the panels may be of other construction, such as wire grill or wooden fence panels. In this case, each side panel will be formed in two parts, one of which can slide over the other in order to retract for storage purposes and to allow adjustment of the size of the corral.

Figure 8:
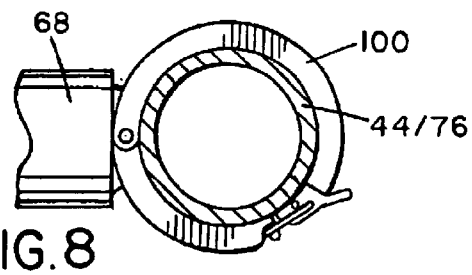
FIG. 8 is a sectional view illustrating a detachable fastener securing a bottom rail to a vertical post in the lowered or raised position.
Figure 7:
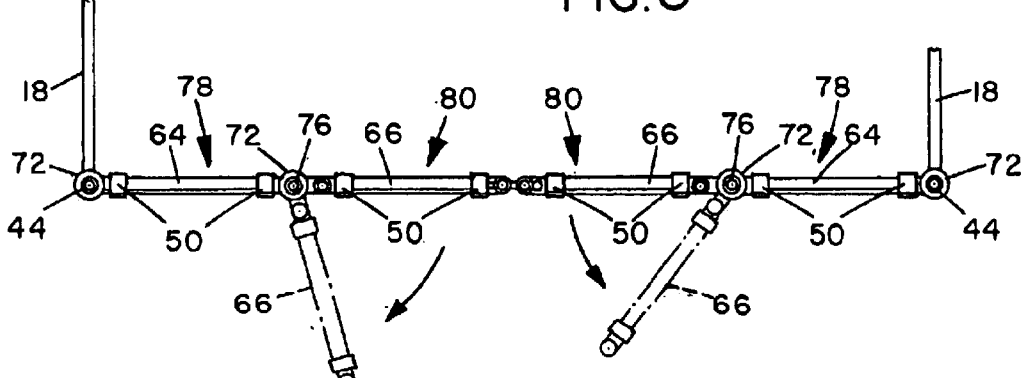
FIG. 7 is top view of the structure of FIG. 6.

FIGS. 6 to 8 illustrate an alternative end panel structure, which allows for a gate for access to the corral while still maintaining the stability. In this alternative, the end panel is still divided into two half panels each pivotally secured to a respective end post 44, and each end panel is further divided into a first half panel portion 78 and a gate portion 80. The first half panel portion 78 has parallel rails 60,64 and 68 each pivotally secured to the post 44 at one end, and to an end post 76 at the other end. Each gate portion 80 also has spaced parallel rails 62, 66 and 70 pivotally secured to post 76 at one end. Rails 62 and 66 are secured to a vertical post 65 at the opposite end, and a retractable latch device 102 is provided at the end of one of the lower rails 70, for engagement with the other rail 70 when the gates are closed, as indicated in FIG. 6. A releasable latch 71 may also be provided for securing the two posts 65 together, as illustrated in FIG. 6, and this may be provided instead of, or in addition to, device 102. Posts 76 may have extendable legs 58 for added stability, as in the previous embodiment. These may be retracted upwardly into the posts and secured by suitable fasteners 59 such as pop pins when the corral is to be stored.

As in the previous embodiment, the upper and middle rails 60 and 64 of each half panel portion 78 are rotatably connected to the posts 44 via collars 205. Each rail 60,64 is rigidly secured to the respective vertical post 76. Each lower rail is rotatably connected to the middle rail 60, as in the previous embodiment, via rotating collars 50 on rail 64 and spaced connecting legs 82 and 84. At the same time, the lower rails 68 are releasably secured to the post 44 at one end and the post 76 at the other end by releasable clamping devices 100, as illustrated in more detail in FIG. 8. The rails 68 can be rotated between the lowered position illustrated in solid outline in FIG. 6, and the raised, storage position illustrated in dotted outline, simply by releasing the clamping devices 100, rotating the rails upwardly by rotating collars 50 about rails 64 until they are adjacent the upper rails 60, and then re-securing the clamping devices 100 to the posts 44 and 76.

The gate portions 80 also have lower rails 70 which are rotatably mounted on the middle rails 66 via collars 50 and connecting legs 86 and 88, and may be rotated into a storage position in a similar manner to the rails 68. The upper and middle rails 62 and 66 are rotatably connected to the respective post 76 via rotatable collars 205, and releasably secured at their outer ends to the posts 76 via collars 100, which are rotatable relative to the respective posts. FIG. 7 illustrates movement of the two gate portions 80 between the closed position illustrated in solid outline, towards an open position, as indicated by the arrows, with the dotted line illustration indicating an intermediate position of each gate portion between the close and open condition. With this arrangement, the gate portions 80 will swing open while the remainder of each half panel, i.e. the first half panel portions 78 remain stationary for added stability. The gate portions 80 may be secured in the closed position by any suitable latch mechanism 71 selected from those known in the art, such as sliding latches, hooks, ties, clamps, or the like.

The end panel of FIGS. 6 to 8 can be collapsed for storage in a similar manner to the previous embodiment, simply by releasing the gate portions 80 from each other, raising the legs 58, rotating each lower rail 68, 70 upwardly, and then rotating each half panel inwardly or outwardly, as appropriate, about post 44 until it is flat against the respective side panel. In this embodiment, the major difference from the first version of the corral apparatus is that the gate does not take up the entire end panel, but instead a smaller gate is provided so that a portion of each half panel does not move when the gate is opened or closed. This is a more stable arrangement, since the legs 58 will stay engaged with the ground at all times while the corral is deployed.

Figure 9:
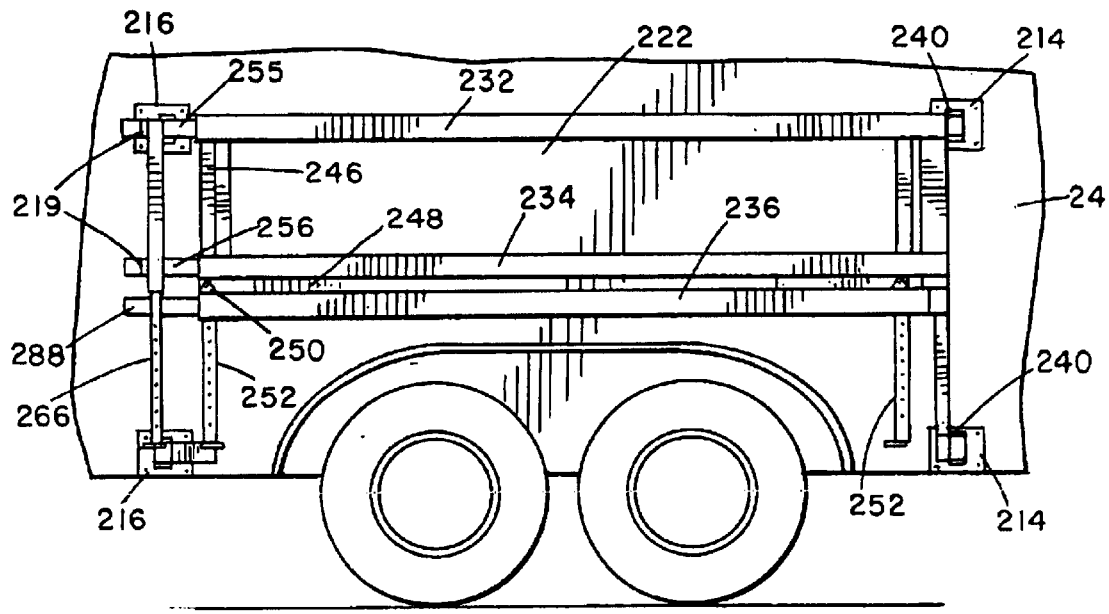
FIG. 9 is a side view of an alternative corral structure collapsed against the side of a vehicle.
Figure 10:
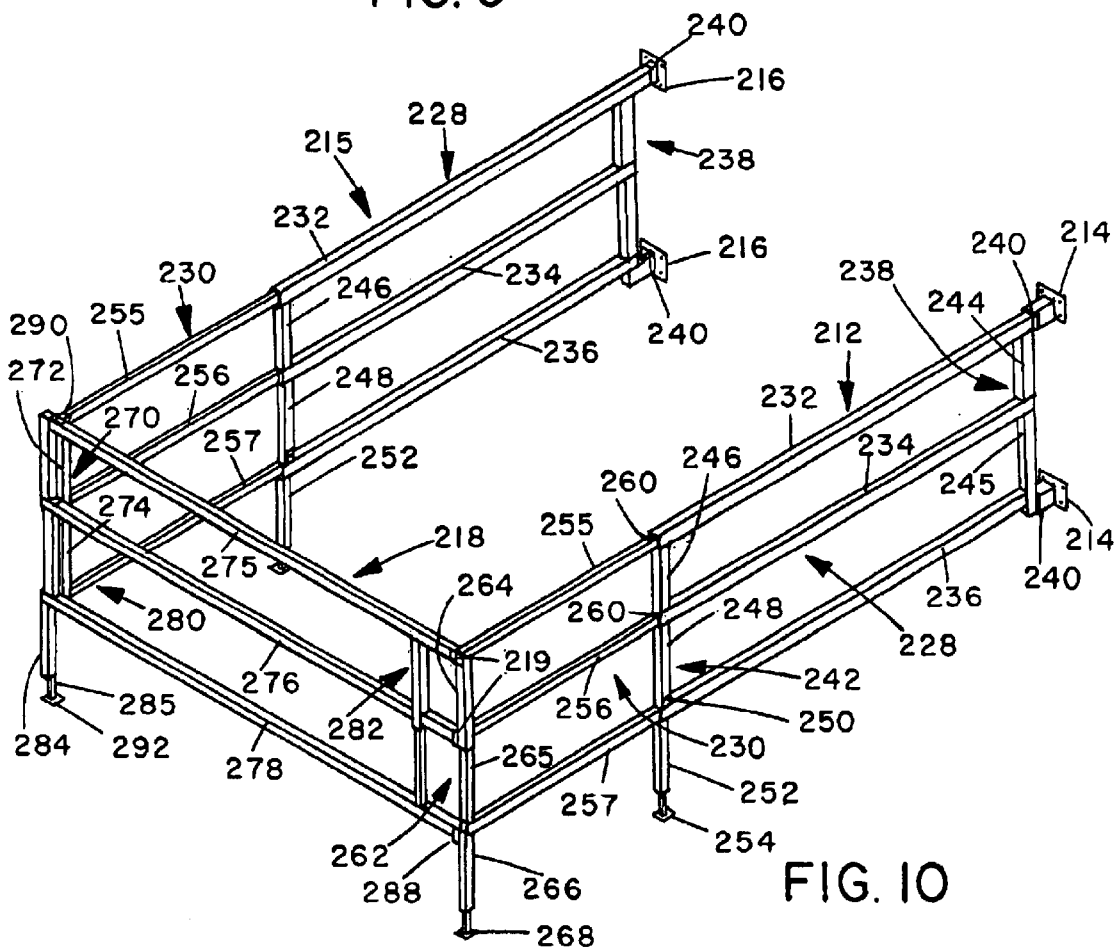
FIG. 10 is a perspective view of the fully extended alternative structure.

FIGS. 9 and 10 of the drawings illustrate a modified, fold-away corral apparatus 210 according to another embodiment of the invention in a folded and stored position and an extended, deployed position, respectively, while FIGS. 11 to 15 illustrate a series of steps in unfolding the apparatus from the stored to the deployed position. The corral apparatus is of similar but more simplified construction than the previous embodiment. As in the previous embodiment, the apparatus 210 may be mounted on a side wall of a trailer 24, as illustrated in the drawings, or may be mounted on a trailer end wall, on a different type of vehicle, or on the wall of a fixed building in order to provide a temporary or retractable corral for horses or other animals. For example, the apparatus 210 may be mounted on an inside or outside wall of a barn to make a fold-away corral for ease of cleaning. The corral can then be folded away when not in use so that it does not take up unnecessary space.

The apparatus 210 basically comprises a first side panel or fence 212 having a first end attached to a first set of upper and lower hinge brackets 214, a second side panel or fence 215 having a first end attached to a second set of upper and lower hinge brackets 216, and an end panel 218 hinged at one end to the second end of the second side panel 215 via hinges 219. A cabinet or housing 220 is provided for storing the corral apparatus 210 in a compact and secure manner when it is folded up and not in use, as illustrated in FIG. 11. The hinge brackets are mounted on a wall 222 of a trailer, building, barn or the like at a predetermined height and spacing. The housing 220 is then secured over the corral apparatus, with the wall 222 acting as the inner wall of the housing. The housing has an upper wall 224 and opposite end walls 225, and doors 226 hinged to the respective side walls for closing the housing when the apparatus 210 is folded away and not in use, as indicated in FIG. 11.

As in the previous embodiment, each side panel is adjustable in length both to vary the size of the corral or enclosure, and for more compact storage purposes. Referring to the fully extended position of FIG. 10, each side panel 212,215 is formed from first and second telescoping portions 228, 230. The first portion has a set of spaced, parallel horizontal rails 232,234,236 and a vertical end post 238 at the first end of each side panel. The upper and lower end of each end post 238 is secured to the upper and lower hinge bracket 214, respectively, by a hinge or pivot connection 240. A second vertical end post 242 is provided at the opposite end of the horizontal rails. Each of the end posts 238,242 is formed from two parts. End post 238 has an upper, tubular part 244 of larger dimensions and a lower tubular part 245 of smaller dimensions which extends through an opening in the first end of middle rail 236 to engage in the open lower end of part 244. End post 242 also has an upper part 246 secured between the ends of the upper and middle rails 232,234, and a separate lower part 248 secured to the end of the lower rail 236 via a hinge connection 250 and releasably secured to the end of the middle rail 236 via a clip or the like. A lower vertical leg 252 extends downwardly from the lower rail 236 in alignment with post 242, and a retractable foot or support 254 is telescopically engaged in the lower end of leg 252.

The second portion of each side panel also has a set of three parallel, horizontal rails 255,256,258 having first ends in telescoping engagement with the open ends 260 of the rails 232,234,236. The structure at the end of the first side panel 212 is different from that at the end of the second side panel. A vertical post 262 is provided at the end of the second, telescoping portion 230 of the first side panel. Post 262 is formed in three parts, comprising an upper tubular part 264 of larger cross-sectional dimensions extending between the ends of the upper and middle rail 255,256, a central part 265 of smaller dimensions which is telescopically engaged in the open lower end of upper part 264, and a lower part or support leg 266 extending downwardly from the end of the lower rail 258 for engaging the ground. The leg 266 also has a telescoping support foot 268. A vertical post 270 at the end of the second telescoping portion of the second side panel 215 extends only across the ends of the horizontal rails, and does not have a ground engaging lower portion. The post 270 is formed in two telescoping parts 272,274, and is similar to the end posts 238 at the first ends of the side panels.

The end panel 218 also has three parallel horizontal rails 275,276,278 with a vertical post 280 at one end of the end panel and a vertical post 282 extending between the upper and lower rails 275,278 at a location spaced from the opposite end of the end panel. Posts 280,282 are of two part, telescoping construction similar to posts 262,270, and the first end post 280 has a vertical support leg 284 extending downwardly from the end of the lower rail 278 with a telescoping foot 285 for engaging the ground. The projecting ends of the upper and middle rail 275,276 are each secured to the vertical post 262 at the end of the first side panel 212 via pivot connections or hinges 219. The projecting end of the lower rail 278 is supported on an upwardly facing U-bracket 288 mounted on the upper end of the support leg 266 of post 262. When in the extended and deployed position of FIG. 10, the free end of the end panel 218 is secured to the end of the second side panel 215 via a suitable latching mechanism, for example by snap engagement of the upper and middle rails 275,276 with C-fittings 290 on end post 270 which are aligned with the respective rails. Each of the telescoping feet 254, 268, 285 of the support legs of the corral may be provided with a flat support pad 292 at its lower end for engaging the ground. Alternatively, U-shaped ground engaging members may be provided, as in the previous embodiments.

Unlike the previous embodiments, in which the end panel incorporated a separate gate, and was thus of multi-part construction, the gate in this case may be provided by the entire end panel 218 or by the telescoping end portion 230 of the second side panel 215. With the corral in the fully extended position of FIG. 10, it can be seen that animals can enter or exit the corral simply by releasing the latches 290 and pushing the end portion 230 inwardly into the first end portion 228 of the side panel. This would be the most stable way to let an animal in and out of the corral because all of the posts 238,242, 262, and 280 would all remain in contact with the ground. If the corral is in the retracted, minimum area condition, with the telescoping end portions of the side panels fully retracted, the end panel 218 acts as the gate by releasing latches 290 and rotating the panel 218 outwardly about pivots 219. This is a much simpler arrangement requiring much fewer parts than the gate structure of the previous embodiments, and provides for additional stability when the telescoping end portion of side panel 215 acts as a gate.

In the storage position of FIG. 9, each of the telescoping second portions 230 of the side panels is retracted inwardly into the first portion 228, and each lower rail 236 is pushed upwardly into a raised position adjacent the middle rail 234, by folding the lower parts 248 of the end posts 242 down against the respective rails 236, and telescoping the lower parts 245 of the end posts 238 into the upper parts 244. Lower parts 265, 274 of end posts 262 and 270 will also be retracted upwardly into parts 264, 272, respectively. The support feet 254, 268 are also telescoped upwardly into the legs 252, 266, respectively. The lower rail 278 of the gate 218 is also pushed upwardly adjacent the middle rail 276 in a similar manner, with the middle parts of posts 280, 282 telescoping into the upper parts, and support foot 285 at the lower end of post 280 retracted into leg 284. The side panel 215 is first folded inwardly about its hinges 240 against the wall 222 on which the apparatus is mounted. The retracted end panel 218 is then folded inwardly about hinges 219 against the retracted side panel 212, and both the side panel 212 and end panel 212 are folded inwardly about hinges 240 against the side panel 215, as illustrated in FIG. 9. The optional cover housing 220 is omitted in FIG. 9 for clarity.

Figure 14:
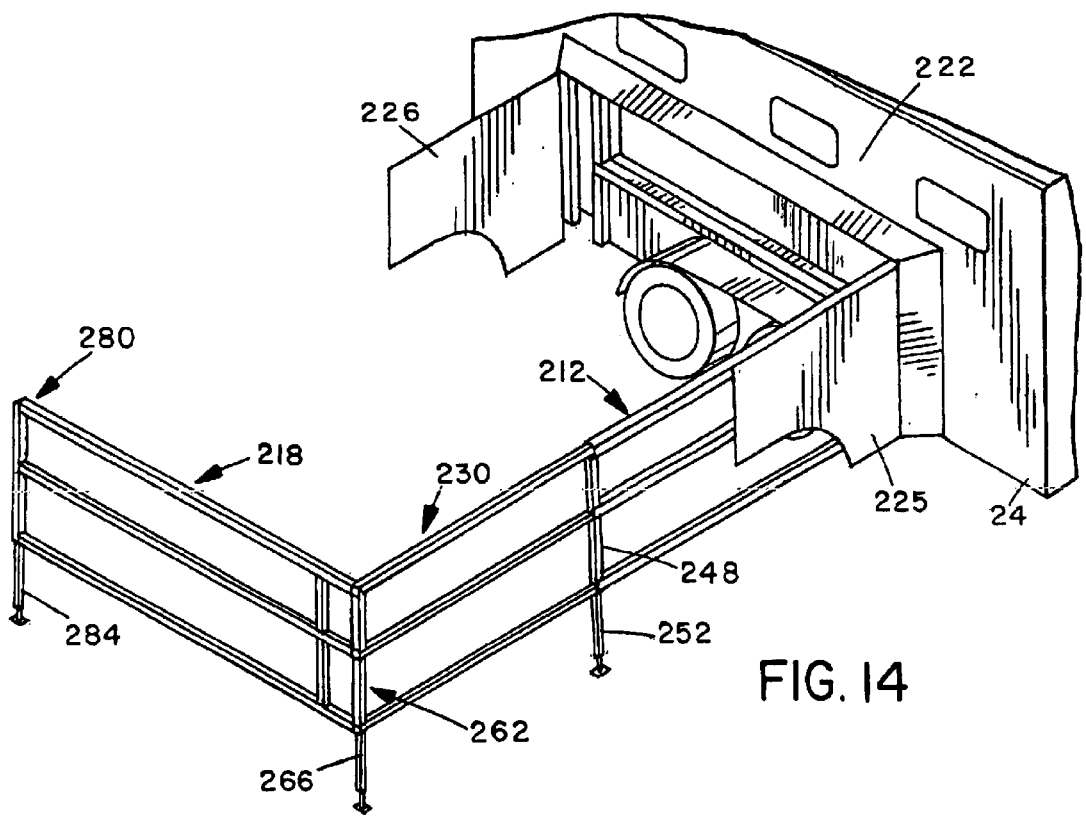
FIG. 14 is a further similar view with the side extended and the end gate opened.
Figure 15:
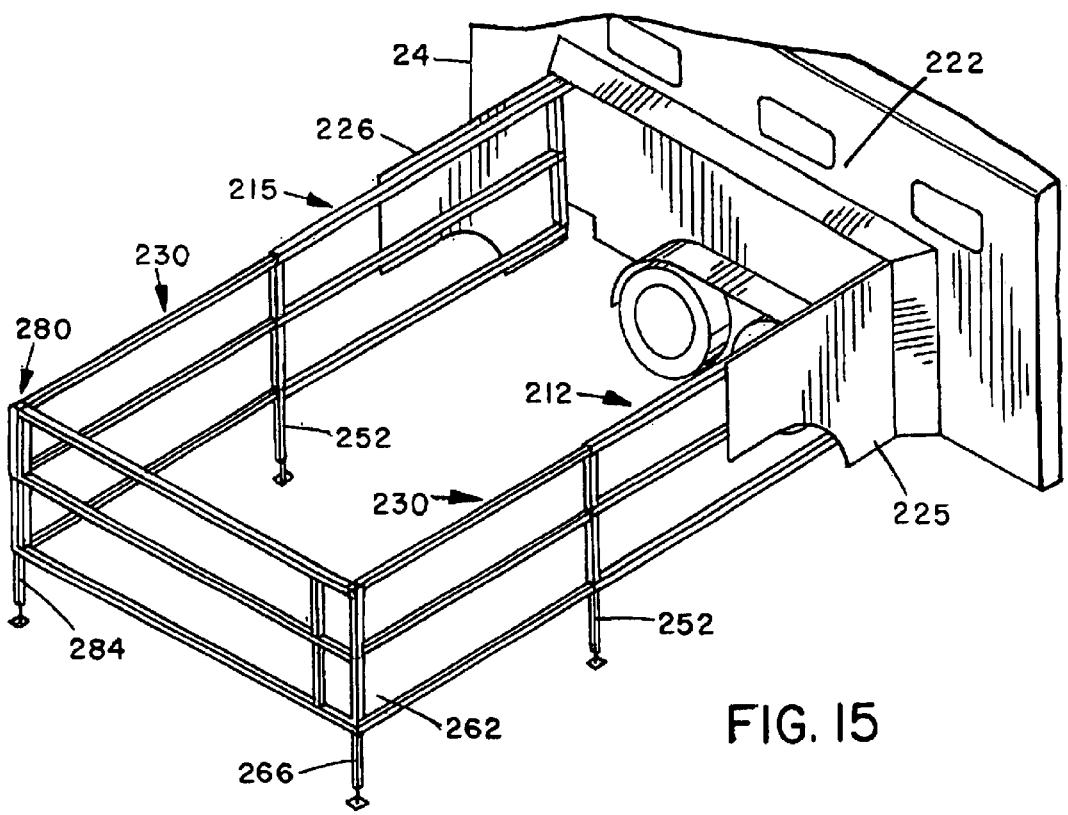
FIG. 15 is a perspective view showing the structure fully extended.

The quick and easy deployment of the corral apparatus 210 from the storage position of FIGS. 9 and 11 into the fully extended and deployed condition of FIGS. 10 and 15 will now be described in more detail with reference to FIGS. 11 to 15. The doors 226 of the cover housing 220 are first opened, as indicated in FIG. 12. The first side panel 212 and folded end panel 218 are then rotated outwardly into a position substantially perpendicular to the wall 222, as illustrated in FIG. 13. The lower rails or bars 236, 257 are then lowered, extending the middle part 265 of end post 262 downwardly out of the upper part 264. The middle part 248 of end post 242 is then folded upwardly and secured to the end of middle rail 234 of the first portion 228 of the side panel 212, and the support foot 254 is lowered to engage the ground. At this point, the telescoping end portion 230 of side panel 212 is extended outwardly to the desired length, depending on the overall dimensions desired for the corral. The support foot 268 is lowered to engage the ground, and the end panel 218 is folded out perpendicular to the side panel 212 by rotating about hinges 219. The lower rail 278 is extended downwardly to rest on the U-bracket 288, and the support foot 285 at the opposite end of the panel 218 is lowered to engage the ground. This intermediate position in the assembly is illustrated in FIG. 14. The side panel 215 is then rotated outwardly perpendicular to wall 222 and the lower rails 236,257 are lowered in the same way as for side panel 212. Support foot 254 on end post 242 of the first portion of panel 215 is lowered to engage the ground, prior to extending the telescoping end portion 230 of the side panel 215 up to the end of the end panel 218 and engaging the C-clips or snap latches 290 over the upper and middle rails 275,276 of the end panel, as illustrated in FIG. 15. All of the releasable support feet will engage suitable locking devices, such as spring-loaded pull pins, on the associated legs in the retracted and deployed positions, in order to hold them securely in place.

FIGS. 10 and 15 illustrate the corral apparatus 210 in the fully extended and deployed condition. It will be understood that, as in the previous embodiments, the overall size of the corral may be adjusted simply by sliding each of the telescoping end portions 230 of the side panels inwardly into the first end portions 228 to provide the desired overall corral area. A smaller corral area may be needed if there is insufficient space to fully extend the corral, or if only one animal is to be accommodated. In this case, panel 215 may be rotated about hinges 240 to act as a gate.

The corral apparatus of FIGS. 9 to 15 can be deployed for use and folded up for storage quickly and easily, with a minimum of steps. When folded up, it will take up very little space and can be stored in a simple storage housing 220 as illustrated in FIG. 11. The entire corral apparatus may be manufactured of lightweight aluminum material or the like. The telescoping aluminum frame makes it light yet very strong. The portable corral apparatus can be set up by only one person, and does not require any lifting or great strength for assembly. It can be easily adjusted from a minimum size to accommodate only one animal, to an expanded size as in FIGS. 10 and 15 if more than one animal is to be accommodated.

Figure 16:
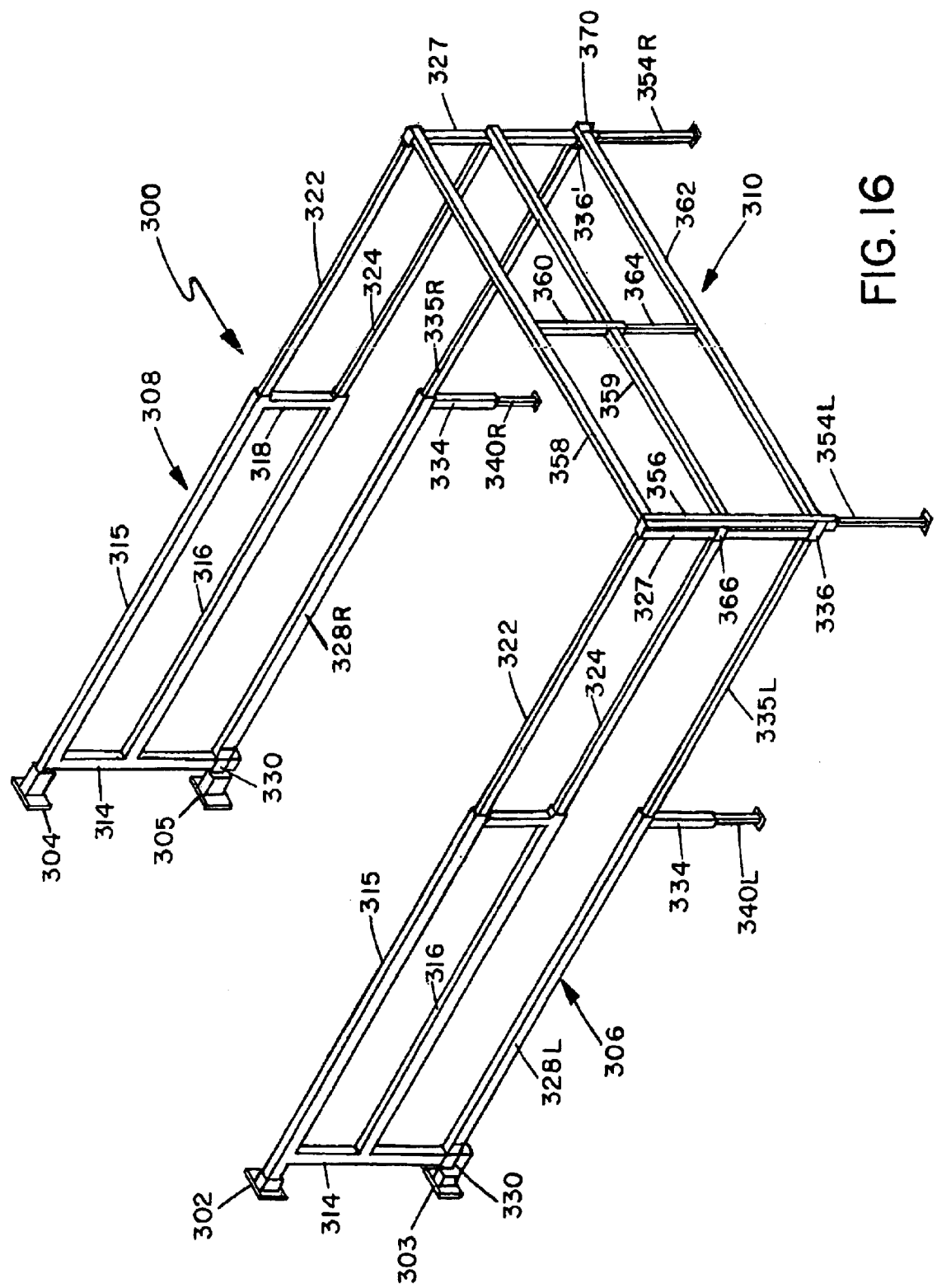
FIG. 16 is a perspective view of a corral apparatus according to another embodiment of the invention.

FIGS. 16 to 18 illustrate a modified portable and collapsible corral apparatus 300 according to another embodiment of the invention. This is similar to the previous embodiment, but has a free sliding lower rail around the three sides of the apparatus, rather than the telescoping or folding arrangements of the previous embodiments, and is of simpler construction. The apparatus 300 has a left pair 302,303 and a right pair 304,305 of mounting brackets for securing to the side or end wall of an animal trailer, or to any other convenient surface such as a barn or other building wall. A left side panel 306, a right side panel 308, and an end panel 310 form the corral enclosure. The left and right side panels are hinged to the respective left and right mounting brackets, while the end panel 310 has one end hinged or pivoted to the end of the right side panel 308.

Figure 19:
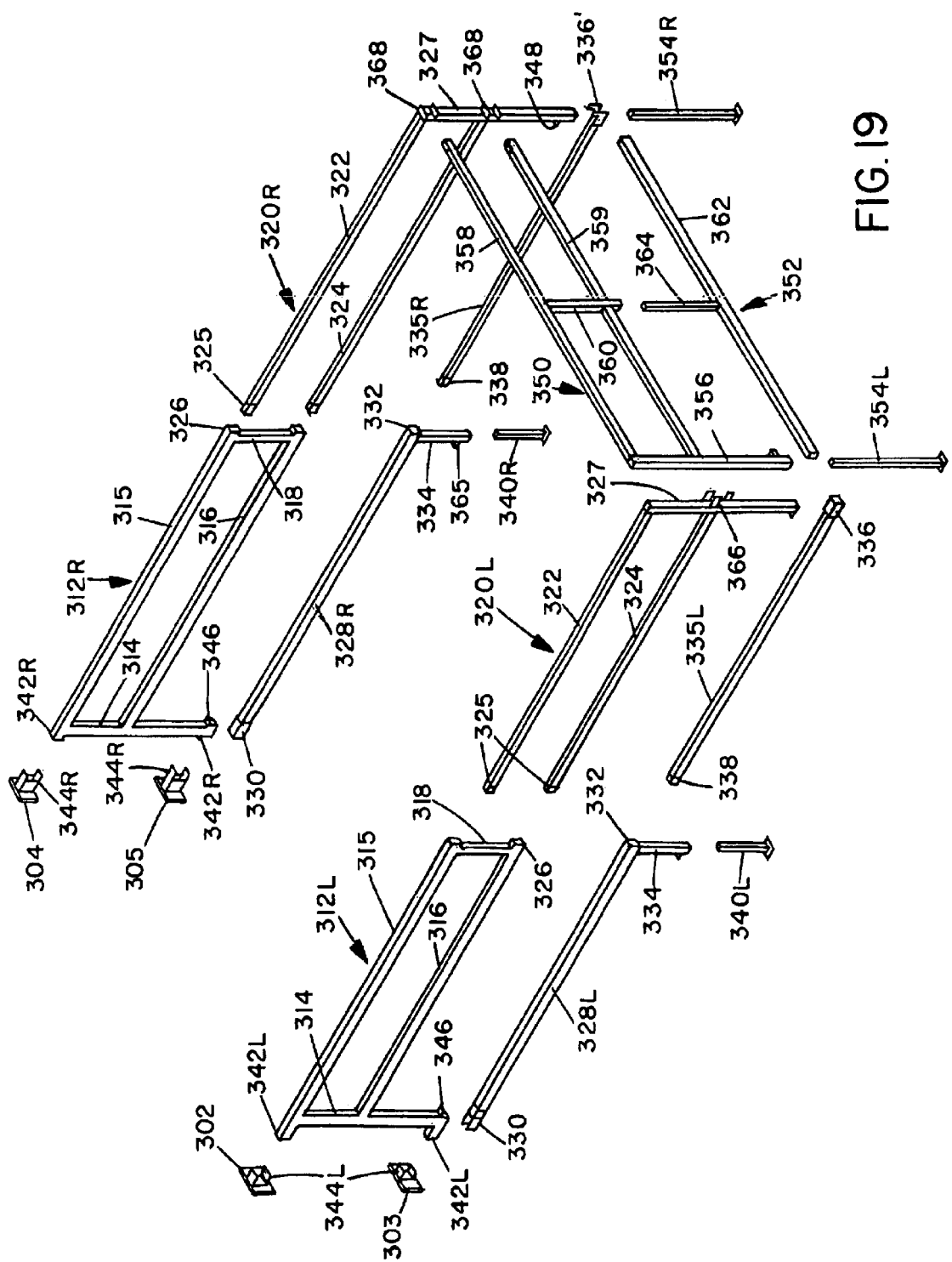
FIG. 19 is an exploded, perspective view of the corral apparatus of FIGS. 16 to 18, illustrating the parts of the apparatus separated.

As best illustrated in the exploded view of FIG. 19, each side panel is made up from five basic parts, each formed from lightweight tubing such as aluminum, steel, plastic or the like which has sufficient strength to retain an animal in the enclosure but which is sufficiently lightweight to allow one person to deploy or fold up the apparatus without undue effort. A first upper rail member 312L, 312R has a vertical post 314 at one end and two parallel rails 315,316 extending from the post 314, connected by a vertical bar 318 at their opposite ends. A second upper rail member 320L,320R has two parallel rails 322,324 with ends 325 designed for telescoping engagement in the open ends 326 of the rails 315,316, and a vertical post 327 at the opposite end. A first lower rail 328L,328R has a first end with projecting brackets 330 for sliding engagement over the vertical post 314 of the first upper rail member, and a second, open end 332, with a vertical leg 334 projecting downwardly from the second end 332. A second lower rail 335L, 335R has a pair of brackets 336, 336' projecting from one end for sliding engagement over vertical post 327, and a second end 338 designed for telescoping engagement in the open end 332 of the first lower rail. The final part of each side panel is a lower leg or support post 340L,340R which is in telescoping engagement with the vertical leg 334 of the lower rail 328L, 328R when the parts are assembled as in FIG. 17.

The vertical post 314 of each upper rail member 312L, 312R has a pair of hinge members 342L, 342R for pivoting engagement with the hinge brackets 344L, 344R on the respective mounting brackets, as best illustrated in FIG. 17. Hinge brackets 344R on the right hand side will be longer than those on the left hand side to accommodate the folded positions of the left and right hand side panels, as also illustrated in FIG. 17. Also provided on each vertical post is a locking tab 345 adjacent the middle rail 316 and facing towards the mounting brackets, and a projecting tab or stop plate 346 projecting in the opposite direction adjacent the lower end of each post 314. A similar projecting tab or stop plate 348 is provided adjacent the lower end of the opposite end posts 327.

The end panel 310 is formed from four basic parts, comprising an upper rail member 350, a lower rail member 352, and two lower support legs or posts 354L,354R. The upper rail member 350 has a vertical end post 356 and two horizontal rails 358,359 extending from the end post, with a vertical bar 360 extending between the horizontal rails at approximately their mid point. The left hand support leg 354L is telescopically engaged in the open lower end of end post 356 of the end panel 310, but the right hand support leg 354R engages in the open lower end of the end post 327 of the right side panel 308. The lower rail member 352 comprises a single lower rail 362 with a vertical bar 364 extending upwardly from its mid point and telescopically engaging in an open lower end of the vertical bar 360. Thus, there are eleven adjustable, telescopically engaged pairs of tubes in the corral apparatus, at the junctions between each first and second upper rail member, between each lower rail member, between each of the four lower legs or support posts 340L, 340R, 354L, 354R and the respective end posts, and between the lower rail member 352 and the upper rail member 350 of the end panel. Each of these junctions is identical, and one such junction will be described between the vertical leg 334 and the lower leg 340L of the left side panel 306. Each lower leg 340L, 340R, 354L, and 354R will be provided with a series of spaced openings (not visible in the drawings), while the vertical leg 334 (or end post 327 or 356) has a pop or snap lock pin 365 (such as a Vlier locking pin) mounted adjacent its lower, open end. This is designed to engage through a selected opening in the telescoping lower leg in order to hold this leg in a retracted position or at any selected extension, as will be discussed in more detail below. Similarly, each of the upper telescoping rails 315 and lower telescoping rails 328R of the right side panel 308 will have snap lock pins 365 for engaging through openings in the mating telescoping rails 322, 335R. Some of these snap lock pins can be best seen in FIG. 17. The telescoping rails of the left hand panels have no associated snap lock pins, since this panel acts as a gate and is secured to the end panel, in any selected extended position, as described below. Each of the four lower legs also has a flat end pad or foot pad 341 with a hole 343 through which a suitable anchor pin or post may be engaged if desired, for additional stability.

The outer end posts 327 of the side panels are slightly different from one another. The left side panel acts as a gate and is therefore releasably secured to the end post 356 of the end panel, while the opposite end of the end panel is pivoted to the end post 327 of the right hand side panel. Thus, end post 327 of the left side panel has projecting flanges or end brackets 366 for engaging on opposite sides of the end post 356 of the end panel 310, and any suitable locking mechanism may be provided for extending through openings in the end brackets 366 to lock the gate, such as a carabineer, padlock, or the like. The end post 327 of the right side panel 308 has two pairs of spaced pivot brackets 368 which are pivoted to the free ends of the respective horizontal rails 358,359 of the end panel upper rail member 350, as best illustrated in FIG. 17. At the same time, the slide brackets on the end of the lower rail 335R of the right side panel, which engage on opposite sides of the end post 327, are extended beyond the end post 327 and provided with hook like indents 370 in which the right hand end of the lower rail 362 of the end panel will be seated when in its lowermost, deployed position as in FIG. 16. A stop tab (not visible in the drawings) will also be provided adjacent the lower end of the left hand end post 327 for seating the opposite end of the lower rail 362 when positioned as in FIG. 16.

FIG. 17 illustrates the corral apparatus in a folded, storage position against a wall on which the mounting brackets 302–305 are mounted, such as the wall of a trailer. Various locking devices may be provided to hold the apparatus in this position. In the illustrated embodiment, the folded apparatus is held in position by locking means which secure the upper left hand corner of the folded apparatus to the upper left hand mounting bracket 302. A lock knob or J bolt 372 extends through a slot 374 at the end of the top rail 358 of the end panel and into a suitable threaded hole or fixture (not illustrated) on the mounting bracket 302. At the same time, in case the lock knob should fail, the right side panel 308, which is at the front when the apparatus is folded, is also secured to the trailer wall by a strap (not illustrated)

which is secured to mounting flanges 375 on the wall mounting bracket 302 at one end, and through a hole in one of the pivot brackets on end or corner post 327. The front panel 308 is also tied to the end panel 310 in the folded position by a strap 376 which is wrapped around the upper rails 358 and 315 of these panels and snapped in place.

Each of the lower rails of the side panels are secured in the raised position of FIG. 18, adjacent the middle rail, by suitable safety straps 378, as best illustrated in FIG. 18. Strap 378 is secured to an opening 379 in the slide bracket 330 at the end of lower rail 328L or 328R, and is threaded through an opening in tab 345 on the post 314 before being snapped into the illustrated, locked position. Alternatively, the tab 345 may be replaced by a snap connector on post 314 to which the end of strap 378 is secured. A similar safety strap arrangement (not illustrated) will be provided at the opposite end of the telescoping part 335L or 335R of the lower rail. In the stored position, each of the telescoping lower legs or support posts 340L,340R,354L and 354R is telescoped inwardly into the corresponding post as far as possible, into the retracted position illustrated in FIG. 17, and locked in that position by the associated snap lock pin 365. Similarly, each of the telescoping end portions of the side panel rails 322,324,335R is in the fully retracted position, retracted as far as possible into the associated rail 315,316,328R and locked in the retracted position by the associated Vlier lock pin 365.

The procedure for extending the corral apparatus from the position illustrated in FIG. 17 to the deployed position of FIG. 16 will now be described in more detail. The trailer to which the apparatus is secured must first be parked on level ground in an area where the animal or animals can be kept. The corral lock knob 372 is then unscrewed and folded out of the way of slot 374. The safety strap at the left hand upper corner is also unhooked and allowed to hang at the trailer wall. At this point, the right side panel 308, which is at the front when the apparatus is folded away for storage, can be swung out about hinges 344R until it is positioned 90 degrees to the trailer wall. Safety strap 378 is then released and unhooked at each end of the lower rail of panel 308, allowing the lower rail 328R,335R to be lowered until it is seated on the stop tabs 346,348. The snap locking pin 365 holding the lower leg 340R is then pulled and twisted to release the lower leg and allow it to drop to the ground. Once the lower leg is in the proper position, the locking pin 365 is released to lock the leg in place. The telescoping portions of the rails of the right side panel are now extended until the side panel is at the desired length (dependent on the corral size requirements and space availability). The locking pin 365 on the upper rail 315 is twisted and pulled out, and the end or corner post 327 is pulled out to the desired corral size. The pin 365 is then released to extend into an aligned opening in telescoping rail 320R, locking the parts in the adjusted position. The Vlier locking pin 365 on the end or corner post 327 is then pulled out to allow the lower leg 354R at the corner of the corral to drop to the ground. The locking pin is then released to lock the lower leg 354 in the lowered position. The assembly of the right side panel 308 is now complete.

While the right side panel is being deployed, it is important that the end panel 310, which is pivoted to this side panel, is held against the side panel by safety strap 376 so that it does not swing out prematurely. When the right side panel has been extended, the safety strap 376 is released, and the front end panel 310 is swung 90 degrees to the right side panel 308, parallel with the trailer wall. The locking pin 365 on the left hand post 356 is then pulled out to allow the lower leg 354L to drop to the ground, and then released to allow the pin to return to the locking position to secure leg 354L. The locking pin 365 on the middle post or bar 360 is then pulled out, allowing the lower rail 362 to be lowered down until one end is seated on the hooked end 370 of bracket 336 and the other end is seated on the stop tab on post 356. The locking pin 365 is then released to lock the lower rail 362 in place. The front end panel 310 of the corral is now fully deployed.

The left side panel 306 is now swung out about the hinges 342L,344L into a position 90 degrees to the trailer wall. The lower rail 328L, 335L is lowered after unhooking the safety straps 378, in exactly the same manner as the lower rail of the right side panel, and seated on the stop tabs 346,348. The end rails 320L and 335L are then extended until the end post 327 is located adjacent to the end post 356 of the end panel, in the position illustrated in FIG. 17. At this point, the gate flanges 366 will extend over the end post 356, and are locked in position by a padlock, carabineer, or the like.

It will be understood that the left side panel acts as a gate to the corral. If the extendable part 320L,335L of the panel is fully extended, the gate may be opened and closed simply by releasing the gate lock or latch and pushing the parts 320L,335L inwardly so that they telescope into the associated rails 315, 316, and 328L, and then pulling them out again and re-latching the gate after the animal or animals have entered the corral. If a smaller corral is being used, due to lack of space, for example, the hinged portion 312L of the side panel can act as the gate, and may simply be pivoted outwardly and inwardly after releasing the gate latch or lock.

The apparatus of FIGS. 16 to 19 is of simple, lightweight construction and is quick and easy to assemble for use, and to fold away for storage after use. Assembly does not require excessive strength or dexterity, since the panels are fully supported on the trailer wall and do not have to be lifted, just folded out and in. Returning the corral from the deployed condition of FIG. 16 back to the stored position of FIG. 17 will simply involve reversing the steps described above.

Due to its light weight and compact nature, the corral apparatus of this invention can be readily mounted on a vehicle such as a trailer used to transport animals, e.g. a horse trailer. On long journeys, the portable corral can be set up anywhere the trailer is parked to accommodate one or more animals during a rest stop, so that they have more space. It may also be conveniently mounted on a wall of a building, such as inside or outside a barn, to provide a temporary corral or foldable corral. The apparatus can then be folded flat against the wall when not in use or when the barn has to be cleaned, for example.

The corral apparatus of this invention is lightweight, inexpensive, and is easy to use. Unlike previous corrals for use with animal trailers or the like, it can be readily and quickly deployed by one person. In the illustrated embodiments, the apparatus is shown attached to an animal trailer, such as a horse trailer, but it may alternatively be attached to a recreational vehicle, for example, to be used for holding pets when camping, for example. Alternatively, the apparatus may be attached to a permanent structure such as a house, garage, or other building or a permanent wall or fence, for use in containing or protecting other animals or children. Thus, for example, it may be used to fence off a pool when not in use, or other potentially dangerous areas, or to provide a temporary outdoor pen for pets or a playpen for young children. The corral can also be easily adjusted in size according to the available space. The retractable lower rails of each panel are extended when the corral is deployed, reducing the space under the fence or panel, and thus reducing the risk of an animal inserting its head under the fence panel.

Although some exemplary embodiments of the invention have been described above by way of example only, it will be understood by those skilled in the field that modifications may be made to the disclosed embodiments without departing from the scope of the invention, which is defined by the appended claims.

We claim:

1. A corral apparatus for attachment to a wall of a vehicle, trailer, or building, comprising:

first and second mounting assemblies for securing at predetermined spaced locations on a wall;

a first side panel having a first end pivotally secured to the first mounting assembly and a second end;

a second side panel having a first end pivotally secured to the second mounting assembly and a second end;

each of the side panels being adjustable in length;

a third end panel extending between the second ends of the side panels in a deployed condition of the apparatus, whereby an enclosure is formed by the wall, side panels and end panel;

the end panel having a first end pivotally secured to the second end of the first side panel and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall; and each mounting assembly comprising first and second mounting brackets and each side panel having at least two parallel horizontal rails, one of said rails being pivotally secured to the first mounting bracket and the other of said rails being pivotally secured to the second mounting bracket.

2. The apparatus as claimed in claim 1, wherein each mounting assembly comprises a single mounting bracket.

3. The apparatus as claimed in claim 1, wherein each side panel has a first portion having a first end corresponding to the first end of the panel and a second end, and a second, telescoping end portion telescopically engaged in the second end of the first portion and extending up to the second end of the panel, whereby the length of each side panel may be adjusted by varying the extension of the telescoping end portion from the first portion of the side panel.

4. The apparatus as claimed in claim 1, wherein each panel comprises a frame having at least two parallel, horizontal cross bars and spaced vertical posts.

5. The apparatus as claimed in claim 4, wherein each frame is made of tubular aluminum material.

6. The apparatus as claimed in claim 4, wherein each frame has three parallel, horizontal cross bars comprising an upper bar, a middle bar, and a lower bar.

7. The apparatus as claimed in claim 6, wherein the cross bars of each side panel frame have telescoping end portions for adjusting the length of the respective side panel between a fully extended position in which the side panel has a maximum length and a fully retracted position in which the side panel has a minimum length.

8. The apparatus as claimed in claim 7, wherein the cross bars are hollow tubular members, the cross bars of each side panel frame each having first and second telescoping parts, the first part being of larger cross-sectional dimensions and the second parts of the cross bars comprising said telescoping end portions.

9. A corral apparatus as for attachment to a wall of a vehicle, trailer, or building, comprising:

first and second mounting assemblies for securing at predetermined spaced locations on a wall;

a first side panel having a first end pivotally secured to the first mounting assembly and a second end;

a second side panel having a first end pivotally secured to the second mounting assembly and a second end;

each of the side panels being adjustable in length;

a third end panel extending between the second ends of the side panels in a deployed condition of the apparatus, whereby an enclosure is formed by the wall, side panels and end panel;

the end panel having a first end pivotally secured to the second end of the first side panel and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall; and each panel having an adjustable lower portion which is movable between a lowered, ground engaging position when the apparatus is in a deployed condition, and a raised, retracted position when the apparatus is in the collapsed and folded position.

10. The apparatus as claimed in claim 9, wherein one of the panels comprises a gate for entry into and exit from the corral when in the deployed condition.

11. The apparatus as claimed in claim 10, wherein the end panel comprises the gate.

12. The apparatus as claimed in claim 10, wherein the gate comprises at least part of one of the side panels.

13. The apparatus as claimed in claim 9, wherein each side panel has a telescoping end portion for adjusting the size of a corral formed by the panels in the deployed condition.

14. The apparatus as claimed in claim 13, wherein the telescoping end portion of the second side panel comprises a gate for animals to enter and exit the corral.

15. The apparatus as claimed in claim 9, including a latch mechanism for releasably securing the second end of the end panel to the second end of the second side panel in the deployed condition.

16. The apparatus as claimed in claim 9, wherein the panels in the deployed condition form a corral having a first pair of corners at the first ends of the side panels and a second pair of corners at a junction between each side panel and the end panel, the panels having a plurality of downwardly depending support legs movable between a retracted position raised above the ground and a lowered, deployed position contacting the ground to support the panels in the deployed condition, the support legs being located at least at the second pair of corners in the deployed condition.

17. The apparatus as claimed in claim 16, wherein each side panel has a first portion and a telescoping end portion telescopically engaged in said first portion at a junction between the first portion and telescoping end portion, and a support leg is provided at said junction.

18. A corral apparatus for attachment to a wall of a vehicle, trailer, or building, comprising:

first and second mounting assemblies for securing at predetermined spaced locations on a wall;

a first side panel having a first end pivotally secured to the first mounting assembly and a second end;

a second side panel having a first end pivotally secured to the second mounting assembly and a second end;

each of the side panels being adjustable in length;

a third end panel extending between the second ends of the side panels in a deployed condition of the apparatus, whereby an enclosure is formed by the wall, side panels and end panel;

the end panel having a first end pivotally secured to the second end of the first side panel and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall; and the lower bar being adjustable between a raised, retracted position adjacent the middle bar and a lowered position spaced below the middle bar.

19. A corral apparatus for attachment to a wall of a vehicle, trailer, or building, comprising:

first and second mounting assemblies for securing at predetermined spaced locations on a wall;

a first side panel having a first end pivotally secured to the first mounting assembly and a second end;

a second side panel having a first end pivotally secured to the second mounting assembly and a second end;

each of the side panels being adjustable in length;

a third end panel extending between the second ends of the side panels in a deployed condition of the apparatus, whereby an enclosure is formed by the wall, side panels and end panel;

the end panel having a first end pivotally secured to the second end of the first side panel and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall; and an outer housing for enclosing the side and end panels in the collapsed and folded position, the housing having an upper wall and opposite side walls, an open inner end for mounting against the wall such that the walls of the housing enclose said mounting assemblies, an open outer end, and at least one door hinged to one of said side walls for movement between a closed position covering the outer end and extending over the collapsed and folded side and end panels, and an open position spaced away from the outer end of the housing to permit the side and end panels to be unfolded and deployed.

20. A corral for attachment to a wall of a livestock trailer or building comprising:

first and second side panels each having first and second vertical end parts at first and second ends of said side panel, and top, middle, and bottom parallel horizontal rails, each spaced at a distance from each other, wherein each side panel is hingedly connected at the first end to a wall and pivots approximately perpendicular to the wall and wherein each of the second ends of the panels are located at a distance from the wall;

each horizontal rail being formed in two telescopically engaged parts moveable between extended and retracted positions to adjust the length of the side panels;

a third, end panel having opposite first and second ends and a top, middle, and bottom parallel horizontal rails, wherein the first end of the end panel is hingedly connected to the second end of the first side panel, such that the side and end panels fold parallel to the wall for storage of the corral in a collapsed position; and releasable locking means for locking the panels together in the collapsed position.

21. A corral apparatus for attachment to a vehicle, trailer, or building, comprising:

mounting brackets for securing at predetermined spaced locations on a surface of a vehicle, trailer, or building;

a first side panel having a first end pivotally secured to one of the mounting brackets and a second end;

a second side panel having a first end pivotally secured to the other mounting bracket and a second end;

each of the side panels being adjustable in length;

a third end panel extending between the second ends of the side panels, whereby an enclosure is formed by the surface, side panels, and end panel;

the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface; and each side panel comprising at least two parallel horizontal rails, each rail having a first end pivotally linked to a respective mounting bracket and a telescoping end portion extending up to the second end of the panel, and a vertical post at the second end of the panel, each telescoping end portion having a first end telescopically engaged in the respective rail and a second end secured to said post, whereby said end portions are extendable between a retracted position telescoped inwardly into the respective rails and an extended position extending outwardly from the respective rails in order to adjust the length of the side panel.

22. The apparatus as claimed in claim 21, wherein at least part of the end panel comprises a gate for entry to and exit from the corral.

23. The apparatus as claimed in claim 22, wherein the entire end panel comprises the gate, the end panel having a first end pivotally secured to the second end of the first side panel, and a second end, a releasable latch being provided for releasably securing the second end of the end panel to the second end of the second side panel.

24. The apparatus as claimed in claim 22, wherein the end panel comprises two half panels, each half panel having a first end pivoted to the respective side panel and a second end, and a latch device is provided on the half panels for releasably securing the second ends of the half panels together.

25. The apparatus as claimed in claim 24, wherein each half panel comprises a first portion pivotally secured to the second end of the respective side panel and having an inner end, and a second portion pivotally secured to the inner end of the first portion, the second portion comprising a half gate.

26. The apparatus as claimed in claim 21, wherein end panel is formed in one piece.

27. The apparatus as claimed in claim 21, wherein said two rails of each side panel comprise a top rail and a middle rail, and each side panel further includes a bottom rail parallel to the first two rails and spaced below the middle rail, said bottom rail further including a telescoping end portion.

28. The apparatus as claimed in claim 27, wherein said bottom rail has at least two spaced support legs extending downwardly for engagement with a ground surface.

29. The apparatus as claimed in claim 28, wherein said support legs are rotatably mounted on said bottom rail for rotation between a downwardly extending, deployed condition and an upwardly rotated position for storage.

30. The apparatus as claimed in claim 29, wherein each support leg has a free end having a clamp for releasable connection with said middle rail in the storage position.

31. The apparatus as claimed in claim 28, wherein each support leg has a foot mounted at its lower end, the foot being of inverted horse-shoe shape.

32. The apparatus as claimed in claim 21, wherein each end post has a lower end, and a leg telescopically engaged with said post and projecting from said lower end, the leg having a foot for engaging the ground when the respective side panel is in the deployed position.

33. The apparatus as claimed in claim 21, wherein said end panel has at least two horizontally extending, parallel rails.

34. The apparatus as claimed in claim 33, wherein said end panel has an upper, a middle, and a lower horizontal rail.

35. The apparatus as claimed in claim 21, wherein said end panel comprises two half panels, each half panel having a first end pivotally secured to the second end of the respective side panels and a second end, and a vertical post secured to the second end of the half panel, whereby each half panel can be rotated between a storage position flat against a respective side panel and a deployed position extending away from the side panel with the vertical post adjacent the vertical post of the other half panel, and a releasable latch mechanism is mounted on one of said half panel posts for releasable latching engagement with the other half panel post.

36. The apparatus as claimed in claim 21, wherein said side and end panels each have an upper portion and a lower portion, the lower portion being movably mounted relative to the upper portion for movement between a storage position located against the upper portion and an extended, operative position extending downwardly from the upper portion to engage the ground.

37. The apparatus as claimed in claim 36, including releasable locking means for releasably locking each panel lower portion in the storage position.

38. A corral for attachment to a wall of a livestock trailer or building comprising:

first and second side panels each having first and second vertical end parts at first and second ends of said side panel, and top, middle, and bottom parallel horizontal rails, each spaced at a distance from each other, wherein each side panel is hingedly connected at the first end to a wall and pivots approximately perpendicular to the wall and wherein each of the second ends of the panels are located at a distance from the wall;

each horizontal rail being formed in two telescopically engaged parts moveable between extended and retracted positions to adjust the length of the side panels;

a third, end panel having opposite first and second ends and a top, middle, and bottom parallel horizontal rails, wherein the first end of the end panel is hingedly connected to the second end of the first side panel, such that the side and end panels fold parallel to the wall for storage of the corral; and each side panel comprising first and second vertical end posts, an upper rail member extending between the end posts, and a lower rail member having opposite ends slidably engaging said end posts for movement between a raised position and a lowered position.

39. The apparatus as claimed in claim 38, including a releasable locking device for locking the lower rail member in the raised position, and at least one of the end posts having a stop tab for supporting the lower rail member in the lowered position.

40. The apparatus as claimed in claim 38, wherein each upper rail member has a first rail part and a second rail part telescopically engaged in the first part for adjusting the length of the panel.

41. The apparatus as claimed in claim 40, wherein each lower rail member has a first rail part and a second rail part telescopically engaged in the first rail part for adjusting the length of the panel.

42. The apparatus as claimed in claim 38, wherein each end panel has an upper rail member extending between said first and second end and a lower rail member adjustably secured to said upper rail member for movement between a raised position and a lowered position.

43. A corral apparatus for attachment to a wall of a vehicle, trailer, or building, comprising:

first and second mounting assemblies for securing at predetermined spaced locations on a wall;

a first side panel having a first end pivotally secured to the first mounting assembly and a second end;

a second side panel having a first end pivotally secured to the second mounting assembly and a second end;

a third end panel extending between the second ends of the side panels in a deployed condition of the apparatus, whereby an enclosure is formed by the wall, side panels and end panel;

the end panel having a first end pivotally secured to the second end of the first side panel and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall;

each of the side panels having a telescoping end portion for adjusting the size of a corral formed by the panels in a deployed condition; and a releasable locking device for locking the panels to at least one mounting assembly in the collapsed position.

* * * * *